March 30, 1943.  C. W. WEHE  2,314,959
POWDERED SOAP DISPENSER
Filed March 19, 1941   2 Sheets-Sheet 1

Inventor
Clifford W. Wehe
By George F. Haight
Atty.

March 30, 1943.                C. W. WEHE                2,314,959
                          POWDERED SOAP DISPENSER
                          Filed March 19, 1941          2 Sheets-Sheet 2
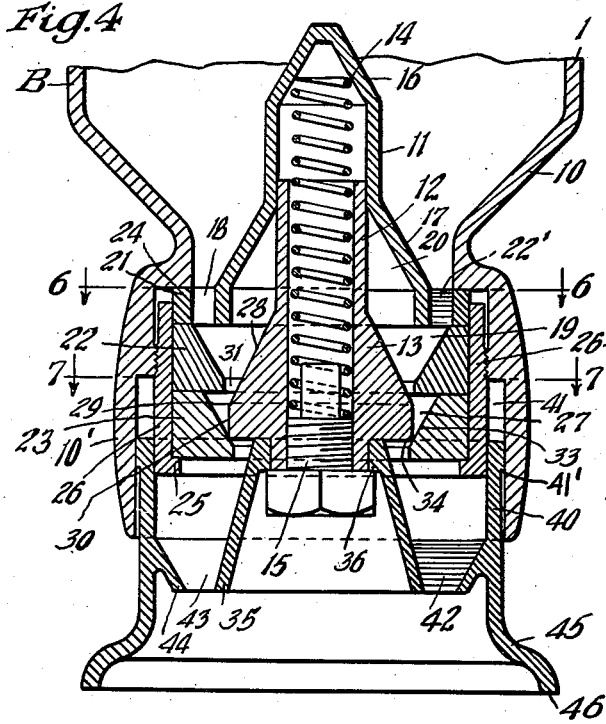
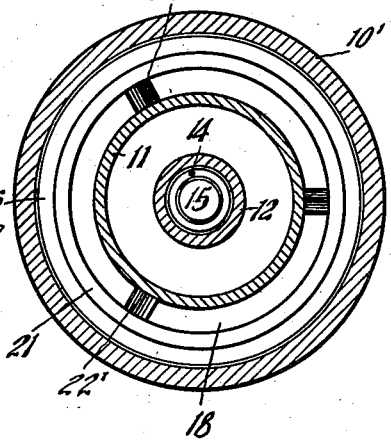
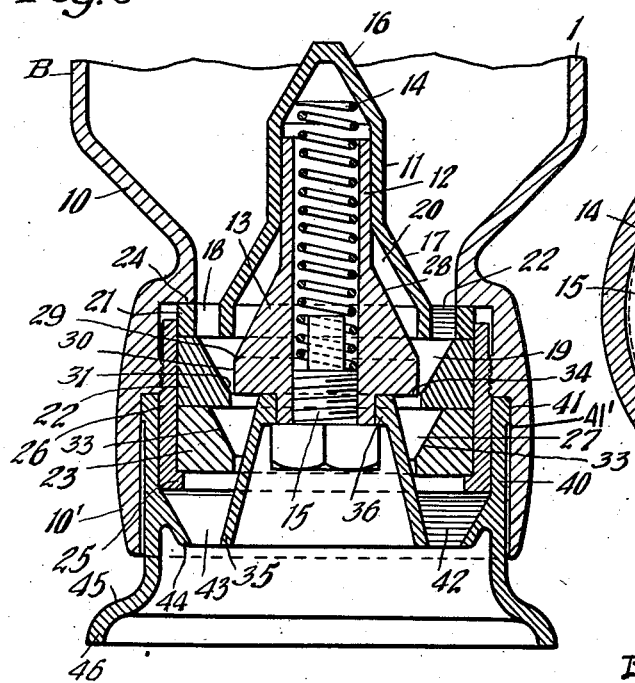
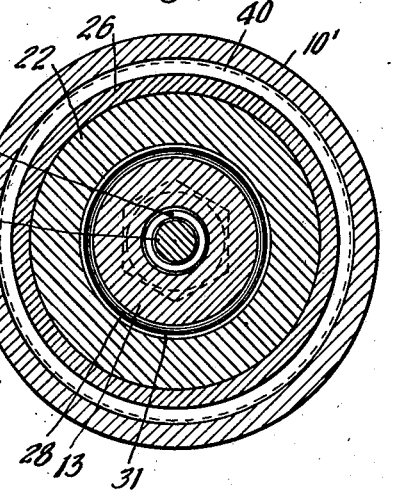
Inventor
Clifford W. Wehe
By George I. Haight
Atty.

Patented Mar. 30, 1943

2,314,959

UNITED STATES PATENT OFFICE 2,314,959

POWDERED SOAP DISPENSER

Clifford W. Wehe, Chicago, Ill.

Application March 19, 1941, Serial No. 384,073

10 Claims. (Cl. 221—114)

My invention relates to commodity dispensing mechanism, and particularly to improvement in mechanism of the type for dispensing measured quantities of powdered materials such as soap.

One of the objects of my invention is to avoid the tendency of the powder to pack by the provision of means wherein the operating parts do not raise and lower the whole mass of powder in the container each time the parts are operated.

Another object is the provision of means for agitating the body of powder in the container by blowing or injecting air into the body of the powder each time the dispensing mechanism is operated.

Another object is the provision of receiving and measuring chambers with means which definitely cut off the flow of powder from the receiving chamber to the measuring chamber while the charge in the measuring chamber is being discharged.

Another object is to prevent the caking of the powder on the operating parts and the surfaces thereof associated with the discharge of the material.

Another object is to provide a dispensing mechanism which can be made ornamental in appearance and can be mounted on a wall with the fastenings concealed.

Another object is to distribute the discharged quantity of powder over a greater area in the palm of the hand free from contact with the operating parts which come in contact with the hand in the operation of the device.

Another object is to facilitate the manufacture of the device by the use of parts all of which can be made as die castings which can be readily assembled without skill or machine work.

Other object of the invention will appear hereinafter.

Referring to the accompanying drawings,

Fig. 4 is an enlarged central vertical section on the line 4—4 of Fig. 1, showing the parts in their lower or normal position;

Fig. 5 is a section similar to that of Fig. 4, showing the parts in their raised or discharging position;

Fig. 6 is a transverse section on line 6—6 of Fig. 4; and

Fig. 7 is a transverse section on line 7—7 of Fig. 4.

Figure 1:
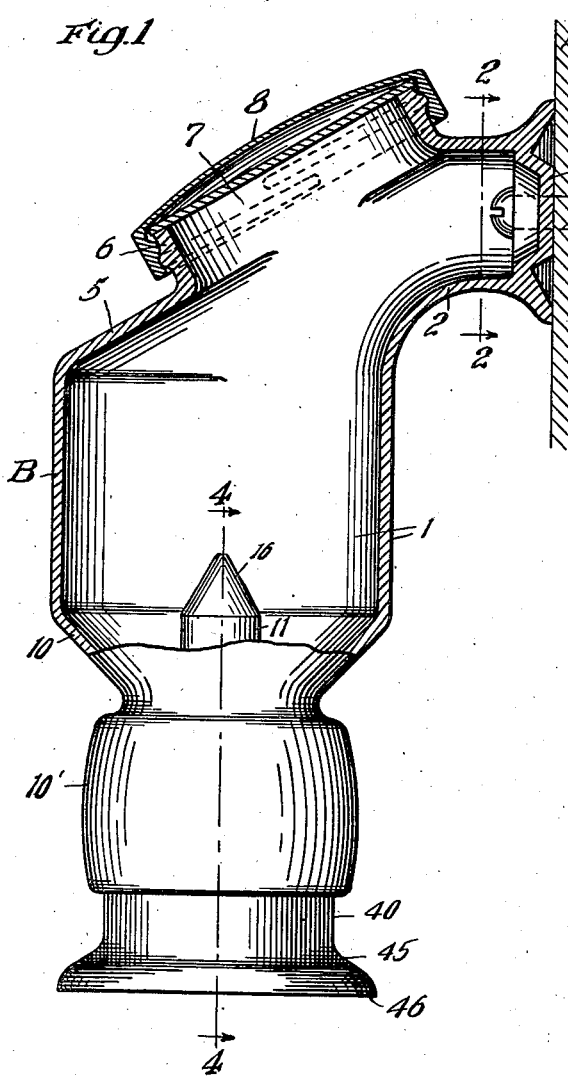
Fig. 1 is a view partly in elevation and partly in section, illustrating a structure embodying my invention.
Figure 2:
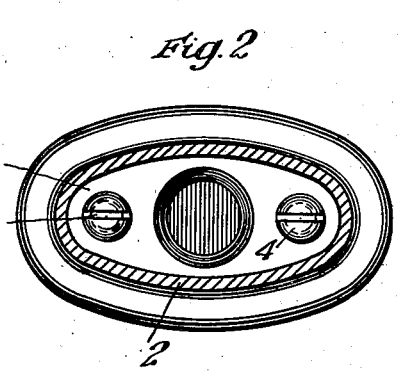
Fig. 2 is a transverse section on the line 2—2 of Fig. 1.
Figure 3:
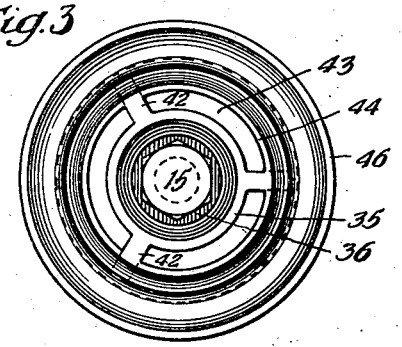
Fig. 3 is a bottom plan view of the structure shown in Fig. 1.

The device shown in the drawings is designed to be ornamental and is arranged to be mounted upon a vertical wall A. The structure is generally cylindrical and includes a hollow body B which provides a suitable container portion 1 for a suitable quantity of powdered soap. The upper end portion 2 of the body is laterally offset to form a neck having a mounting base 3 which is fastened against the wall by suitable screws 4. These screws are inserted through the base from within the neck so that the screws are not exposed to mar the appearance and to lessen the danger of unauthorized removal of the device. The top wall 5 is relatively flat and has a circular flange 6 surrounding an opening 7 through which the container may be readily filled. The opening is covered by a suitable screw-threaded cap 8 on the flange 6. The upper wall 5 of the container is disposed at such an angle with respect to the vertical, that the filling opening 7 is positioned to permit access therethrough to the screws 4. If desired, the device may be provided with suitable locking means for the cap to prevent unauthorized access to the interior.

The lower portion of the wall of the body is inclined downwardly to form a hopper 10 to direct the soap powder into the measuring and dispensing mechanism. The body has an extension below the hopper in the form of a collar 10' which contains and provides a support for the operating mechanism.

Concentrically disposed in the body and extending well up into the hopper portion is a tubular or cylindrical guide member 11 for the tubular portion 12 of the valve plunger 13. A coiled spring 14 within the guide and stem yieldingly holds the valve and operating parts down in normal position. The spring bears against a threaded plug 15 in the lower end of the valve member. The upper end 16 of the guide member is cone-shaped to shed the powdered soap. The lower portion 17 is flared to bring its lower marginal portion close to the wall of the hopper to provide an annular space 18 forming an outlet through which the powdered soap is supplied to an annular receiving chamber 19. The flared portion 17 forms a guard which overlies the valve member 13 and prevents the whole mass of soap in the container from resting upon or being supported by the valve member; thus the valve member does not raise or lift the whole mass of powder each time it is operated and then suddenly drop the mass each time the valve member is lowered, which action would otherwise pack the mass in the throat or space 18 and prevent the proper flow of the powder. In addition to preventing packing of the powder, the powder is actually agitated by air each time the valve member is operated. The flared or skirt portion 17 forms an interior chamber 20 into which the valve member 13 (Fig. 5) enters each time the valve is raised, thus reducing the volume of the chamber and forcing the air out of said chamber. The air bubbles up through throat 18 and through the mass of soap, thus agitating the mass of soap especially in the region of said throat. The movement of the valve stem 12 within the guide also acts as a pump to compress the air therein; the clearance between the guide member and stem being such that the compressed air escapes into chamber 20 and is cumulative in its agitating effect.

The guide and guard member 11 is supported by and concentrically spaced from a ring 21, being connected therewith by the three ribs 22' to coincide with the throat 18. This ring, together with the two valve rings 22 and 23, is clamped between a shoulder 24 on the interior of the extension collar 10' and a flange 25 on the lower end of a sleeve 26. The sleeve 26 is threaded at 26' to engage the corresponding threads on the interior wall of the collar 10'. All of these parts are concentrically disposed within the collar, and the rings 21, as well as the rings 22 and 23, are all made as separate pieces for convenience in manufacture and assembly. In the present structure these parts are all made as die castings.

The two ring members 22 and 23, in co-operation with the valve member 13, form two annular chambers 19 and 27. The upper chamber 19 communicates with the container through the annular passage 18 and serves as a receiving chamber for a quantity of powder which is in readiness to flow into the measuring chamber 27 when the valve member is raised.

The valve member 13 has a downwardly inclined wall 28 which extends from the stem to an intermediate point 29, and from this point the wall portion 30 is vertical and is slightly spaced from the ring 22 to provide an annular passage 31 communicating with the measuring chamber 27. The inner wall 32 of the ring 22 is likewise inclined toward the opposite direction so that when the valve member 13 is in lower position a chamber 19 substantially V-shaped in cross section is formed. The walls of the ring 22 and the ring 23 are converged downwardly to properly shed the soap powder and direct the flow thereof to the passage 31. The parts are so proportioned that the passage 31 is large enough the permit the flow of powder into the measuring chamber when the valve is in its lower position as shown in Fig. 4. When, however, the valve rises to its upper position, as shown in Fig. 5, the passage 31 is closed to prevent the flow of soap powder therethrough. This is due to the fact that the clearance between the vertical wall 30 of the valve member and the opening of ring 22 is just sufficient to permit the free movement of the valve member. As the point 29 rises into the opening of ring 22, it shears the body of powder and cuts off the flow thereof into chamber 27. Due to the fact that the wall portion 30 moves in a vertical line, it does not exert any lateral movement to the powder within the chamber 19, and any powder in said chamber resting against the wall 28 of the valve member 13 will simply be raised into the chamber 20 within the guard member. The movement of the valve member therefore does not raise and lower the whole mass of powder in the container and cause it to pack.

The measuring chamber 27 is formed between the inclined or tapered wall 33 of the ring member 23, and the vertical wall portion 30 of the valve member when the valve member is in its lower position. In this position (Fig. 4) the lower margin 34 of the valve member seats on the wall 33 and forms a tight seal against the release of powder from the measuring chamber 27. Upon the raising of the valve member off its seat, a direct opening for the discharge of the measured quantity of powder from the chamber 27 is provided through the ring member 23.

The valve member is supported by an inverted bell or cup-shaped member 35 which extends through ring 23. Its upper wall 36 is clamped between the valve member 13 and the head of the plug 15. Because of its diverging wall, the member 35 acts as a guide to enlarge the ring of powder discharged upon the hand of the person operating the device.

The valve mechanism is operated by a sleeve member 40 which slides vertically in the annular recess 41 in the inner wall of the collar 10' and between said collar and the inner sleeve 26. The vertical movement of the sleeve member in this recess 41 causes it to act as an air compressor and blow air downwardly along its inner wall surface and that of the sleeve 26 which tends to keep those surfaces clear of any water or soap which may reach them. In addition, the outer wall of sleeve 41 is reduced in diameter for the most of its height to leave a shoulder 41' which acts to scrape downwardly any water or soap which may reach said surfaces. The cup member 35 is mounted upon this operating sleeve, being connected thereto and spaced therefrom by means of several ribs 42 so as to leave an annular discharge opening or throat 43. The operating sleeve member has an inner skirt 44 which diverts the falling powder from the inner wall of the sleeve to prevent the powder from caking upon the wall in the event that moisture may by chance be present on said wall. This purpose in keeping the powder from contact with the wall of the sleeve is furthered by flaring the lower portion 45 thereof to bring its lower edge 46 out to a greater diameter and space it further from the ring of powder deposited upon the hand. The contact edge 46 of the operating sleeve is sufficiently below the discharge throat 43 to prevent a wet hand from depositing water around the edges of the throat where it would be contacted by the soap powder. It is to be noted that the surfaces around and below the discharge throat are all open and smooth, and conveniently accessible for cleaning.

I claim:

1. In a powdered soap dispenser, the combination of a container for the material, a concentrically disposed cylinder in said container having a flared skirt member having its margin spaced from the wall of the container to form an annular outlet, concentrically disposed fixed and vertically movable walls converging downwardly to form between them a receiving chamber in communication with said outlet when said movable wall is in lower position, said movable wall being disposed beneath said skirt so as not to impart raising or lowering movement to the body of material in the container, and having a plunger portion guided in said cylinder.

2. In a powdered soap dispenser, the combination of a container for the material, a concentrically disposed skirt member in said container and spaced from the wall thereof to form an annular outlet, concentrically disposed fixed and vertically movable walls converging downwardly to form between them a receiving chamber in communication with said outlet when said movable wall is in lower position, said movable wall being disposed beneath said skirt so as not to impart raising or lowering movement to the body of material in the container, said converging walls being spaced to form a discharge outlet for said receiving chamber, and means effective to close said discharge outlet as the movable wall moves to an upper position.

3. In a powdered soap dispenser, the combination of a container for the material, a concentrically disposed skirt member in said container and spaced from the wall thereof to form an annular outlet, concentrically disposed fixed and vertically movable walls converging downwardly to form between them a receiving chamber in communication with said outlet when said movable wall is in lower position, said movable wall being disposed beneath said skirt so as not to impart raising or lowering movement to the body of material in the container, said converging walls being spaced to form a discharge outlet for said receiving chamber, means effective to close said discharge outlet as the movable wall moves to an upper position, means forming a measuring chamber below said receiving chamber to receive material through said discharge outlet when open, said measuring chamber having a normally closed discharge outlet and a valve adapted to open said normally closed outlet when said receiving chamber discharge outlet is closed.

4. In a powdered soap dispenser, the combination of a container having an outlet, dispensing mechanism for receiving powdered soap from said outlet and discharging measured quantities of said material, and means operable when said dispensing mechanism is operated for discharging air upwardly through said container outlet and into the body of material in the container to agitate said material.

5. In a powdered soap dispenser, the combination of a container having an outlet, dispensing mechanism including a receiving chamber below said outlet for receiving powdered soap from said outlet and discharging measured quantities of said material, and pump means associated with said dispensing mechanism for discharging air upwardly through said outlet into the body of material in the container to agitate the material in said receiving chamber and in the region of said outlet to prevent the packing thereof.

6. In a powdered soap dispenser of the class described, the combination of a container having an annular discharge outlet, inclined walls and a valve member forming annular receiving and measuring chambers disposed one above the other with an annular communicating outlet therebetween, said measuring chamber having an annular bottom outlet, said valve member being concentrically disposed with respect to said chambers and vertically movable to control said outlets, said valve member being normally seated on the inclined wall of the measuring chamber to close said bottom outlet, means for moving said valve member upwardly to close said communicating outlet and raise the valve off of its seat to open said bottom outlet to discharge the measured quantity of material from said measuring chamber in the form of an annulus.

7. In a powdered soap dispenser of the class described, the combination of a container having an annular discharge outlet, inclined walls and a valve member forming annular receiving and measuring chambers disposed one above the other with an annular communicating outlet therebetween, said measuring chamber having an annular bottom outlet, said valve member being concentrically disposed with respect to said chambers and vertically movable to control said outlets, said valve member being normally seated on the inclined wall of the measuring chamber to close said bottom outlet, means for moving said valve member upwardly to close said communicating outlet and raise the valve off of its seat to open said bottom outlet to discharge the measured quantity of material from said measuring chamber in the form of an annulus, said means including an annular hand-operated member concentrically disposed with respect to said bottom outlet and having an annular hand-contact edge disposed appreciably below said bottom outlet and of appreciably larger diameter than that of the discharged annulus of material.

8. In a powdered soap dispenser of the class described, the combination of a container having a depending tubular extension, a vertically movable valve member positioned in said extension, a sleeve threaded into said extension, ring members concentrically disposed with respect to said valve member and clamped in said extension by said sleeve, said ring members having interior inclined walls forming with said valve member chambers one above the other with a communicating outlet therebetween, said lower chamber having a bottom discharge outlet and said upper chamber communicating with said container, said vertically movable valve member controlling said communicating outlet and said bottom outlet, and a hand-operating member for said valve member slidable vertically in said extension and having an annular contact edge below said bottom outlet.

9. In a powdered soap dispenser of the class described, the combination of a container having a depending tubular extension, a vertically movable valve member positioned in said extension, a sleeve threaded into said extension, ring members concentrically disposed with respect to said valve member and clamped in said extension by said sleeve, said ring members having interior inclined walls forming with said valve member chambers one above the other with a communicating outlet therebetween, said lower chamber having a bottom discharge outlet and said upper chamber communicating with said container, said vertically movable valve member controlling said communicating outlet and said bottom outlet, a hand-operating member for said valve member slidable vertically in said extension and having an annular contact edge below said bottom outlet, and means below said bottom outlet and above said contact edge forming an annular throat for directing the discharged material into an annular form appreciably less in diameter than said contact edge and concentric therewith.

10. In a soap dispenser of the class described, a container body having its upper end portion turned laterally and provided with a mounting base in a plane substantially parallel with the vertical axis of the body and offset with respect to the body, a filler opening for said body in said laterally turned portion, said opening being disposed in substantially horizontal alignment with the interior of said laterally turned portion and in substantially vertical alignment with the body to provide access to fastening means in said mounting base, and a top filler opening for the body.

CLIFFORD W. WEHE.